United States Patent [19]

Fried

[11] Patent Number: 4,682,648
[45] Date of Patent: Jul. 28, 1987

[54] TEMPERATURE OFFSET CONTROL SYSTEM

[76] Inventor: Morton Fried, 706 Bolton Rd., Far Rockaway, N.Y. 11691

[21] Appl. No.: 454,428

[22] Filed: Dec. 29, 1982

[51] Int. Cl.[4] .................... G05D 23/00; F24F 11/00
[52] U.S. Cl. ..................................... 165/12; 165/22; 236/51; 236/46 R; 340/310 A
[58] Field of Search ................. 236/47, 51, 46 R; 62/158; 165/22, 12; 340/310 R, 310 A, 310 CP

[56] References Cited

U.S. PATENT DOCUMENTS

| | | | |
|---|---|---|---|
| 3,636,369 | 1/1972 | Harter | 62/158 X |
| 3,972,471 | 8/1976 | Ziegler | 236/51 X |
| 3,979,060 | 9/1976 | Tierce | 236/46 R |
| 4,077,566 | 3/1978 | Bradford | 236/51 X |
| 4,079,366 | 3/1978 | Wong | 236/47 X |
| 4,132,355 | 1/1979 | Cleary et al. | 236/51 X |
| 4,142,375 | 3/1979 | Abe et al. | 62/158 |
| 4,173,754 | 11/1979 | Feiker | 340/310 A |
| 4,196,848 | 4/1980 | Falkenstein | 236/47 |
| 4,200,862 | 4/1980 | Campbell et al. | 340/310 A |
| 4,200,910 | 4/1980 | Hall | 165/22 |
| 4,217,646 | 8/1980 | Caltagirone et al. | 165/22 |
| 4,248,375 | 2/1981 | Whitney | 165/12 |
| 4,272,012 | 6/1981 | Molnar et al. | 165/12 |
| 4,284,126 | 8/1981 | Dawson | 165/22 |
| 4,308,911 | 1/1982 | Mandl | 165/22 |
| 4,333,316 | 6/1982 | Stamp, Jr. et al. | 236/51 X |
| 4,336,902 | 6/1982 | Neal | 236/47 |
| 4,362,270 | 12/1982 | Cleary et al. | 236/51 X |
| 4,433,719 | 2/1984 | Cherry et al. | 236/51 X |

Primary Examiner—William R. Cline
Assistant Examiner—John K. Ford
Attorney, Agent, or Firm—Helfgott & Karas

[57] ABSTRACT

A temperature offset control system having a central control station wherein temperature limits can be set for the desired amount of offset for both heating and air conditioning systems. A centrally located temperature sensor reads the ambient temperature within the house. A comparator compares this sensed temperature with the offset temperatures and produces a control signal responsive to the comparison. The control signal is then transmitted through the existing house wiring to receivers associated with each heating and/or air conditioning unit, whereby the heating unit will receive the control signal and will respond when that control signal resulted from a sensed temperature crossing the lower end of the temperature limits set at the central control station to thereby turn on and off. The air conditioning unit will receive the same control signal and it will turn on and off in response to receiving a control signal resulting from a temperature crossing at the upper end of the temperature range set at the central control system.

14 Claims, 12 Drawing Figures

TEMPERATURE OFFSET CONTROL SYSTEM

BACKGROUND OF THE INVENTION

This invention relates to energy control systems, and more particularly to a control system which can maintain heating and air conditioning systems operating at offset temperatures.

The temperature within a particular premises is generally maintained by means of heating and/or air conditioning systems. In some cases, a central system is utilized which can provide either heating or air conditioning or the combination thereof. In other situations, individual units may be utilized such as room air conditioners or individual heaters. Each of these heating and/or air conditioning systems generally utilize a local thermostat on which can be set the desired temperature to be maintained. For example, the local thermostat may be set at 78° F. and during winter the heating will turn on as the temperature in the inside atmosphere goes below 78° F. and turns off as the temperature goes above 78° F. Some small range of temperature variation is permitted, generally that of a few degrees. The air conditioning units would similarly operate by being controlled to turn on and off by means of their local thermostats.

When a user leaves his premises for the day, it is wasteful to keep the heating and/or air conditioning units functioning at their normal set temperature. For this reason, the individual may lower the temperature setting on the thermostat for his heating units and may raise the temperature setting on the thermostat unit associated with his air conditioning unit. However, this therefore requires continuous daily adjustment of the thermostat before the individual leaves the premises. This is an inconvenience and the individual often tends to forget to adjust the temperature setting. Additionally, since different temperature settings are required for winter and summer, depending upon whether the heating or air conditioning unit is being operated, it may often confuse the individual to remember which way to adjust the thermostat and, he may in fact adjust it in the wrong direction, thereby causing additional energy to be expended while he is away from the premises.

A further problem is that if the individual does readjust the setting on the thermostat when he leaves the premises, by the time he returns home, the house will be either too hot during the summertime or too cold during the winter time. It will then take some length of time after the individual returns until the house can be returned to a comfortable temperature. For this problem, it has been suggested to include a standard timing device into which the air conditioner or heater is plugged, and have the timer set at approximately one hour before the individual plans to return home. One difficulty is that most heating and/or air conditioning units require high voltage and accordingly the clock must be able to accommodate such high voltage, thereby increasing the cost of the clock. Additionally, if each room has its own individual heater and/or air conditioner, this would require several individual clocks for each unit. On the other hand, if a central heating and/or air conditioning system is utilized, it becomes difficult to connect a clock. Such timing device would have to be built directly into the house wiring and thereby presents a problem of cost, maintenance, and continuous resetting of the time when the individual leaves the house. Since the time clock turns the air conditioning and/or heating completely off, substantial discomfort and/or damage might occur in below freezing climates if the heater is turned completely off. Similarly in very hot and humid climates, cooling the premises back down might take hours, if the air conditioning is turned completely off.

Accordingly, there is a need for a suitable energy saving device which can be utilized to provide temperature offset for heating and/or air conditioning systems which is easy to install, simple to utilize, and reduced in cost.

SUMMARY OF THE INVENTION

It is accordingly an object of the present invention to provide a temperature offset control system which avoids the aforementioned problems of prior art systems.

Another object of the present invention is to provide a central control station with a central temperature sensing device associated with it which can be utilized to provide offset temperature control of both heating and/or air conditioning units from the same unit.

Still another object of the present invention is to provide a central control station which can be utilized to provide centralized control of heating and/or air conditioning systems to turn them on, turn them off, or maintain them operative at offset temperature values.

Yet a further object of the present invention is to provide a temperature offset control system which can be utilized for controlling heating and/or air conditioning systems of either the central type or the individual stand-alone unit type.

Another object of the present invention is to provide a central control system which can be utilized for overriding control of the local thermostat of heating and/or air conditioning units in order to provide temperature offset control.

Still another object of the present invention is to provide a temperature offset control system which can provide centralized control for heating and/or air conditioning systems and can also be utilized to provide centralized control to other electric loads such as lighting systems, appliances, etc.

Another object of the present invention is to provide a temperature offset control system which can provide offset control of heating and/or air conditioning systems and can also be timed to terminate such offset control at a desired time and return the heating and/or air conditioning systems to their local temperature thermostat control.

Briefly, in accordance with the present invention, there is provided a temperature offset control system which comprises a central control station and associated with it a central temperature sensor. At the central control station, a desired temperature range can be preset as desired. Comparison circuitry at the central station compares the sensed temperature by the central temperature sensor with the range of preset temperatures in order to produce a control signal responsive to this comparison. The control signal is transmitted to remotely operate heating and/or air conditioning systems in cooperation with the local independent control of such systems.

In accordance with the present invention, there are also provided receiving stations associated with the heating and/or air conditioning systems for receiving the control signal and thereby suitably controlling the energization of the heating and/or air conditioning systems in response to the received control signal.

In the present invention, the central control station can have three modes of operation including an on mode where it signals the heating and/or air conditioning system to operate in its normal manner so as to be controlled by its local thermostat. There is also provided an off mode which overides any local thermostat control and maintains the heating and/or air conditioning system in an off condition. There is also provided the offset mode where continuous comparison is made between the preset offset temperature and the temperature sensed by the central temperature sensor and produces turn on and turn off signals based upon the results of such comparison.

The turn on and turn off signals are transmitted to the heating and/or air conditioning systems, and these systems respond accordingly. Thus, during winter, the heating system will be the one to turn on when the temperature drops below the offset temperature and during the summer time the air conditioning system will turn on when the temperature rises above the offset temperature. Both systems respond to the same turn on and turn off signals without any additional circuitry directing the signal to the specific system.

In an embodiment of the invention, the signals are transmitted by means of the house wiring wherein the control signal is modulated directly onto the AC lines. Capability is provided for addresssing particular receivers so that a central control station can only control activation of the heating and/or air conditioning systems within that premise. At the same time it can be utilized to control only selected ones of the units, as desired. Additionally, the same central station can be utilized for sending address signals to other electric loads such as lighting, appliances, etc.

These and other objects, features and advantages of the invention will, in part, be pointed out with particularity and will, in part, become obvious from the following more detailed description of the invention, taken in conjunction with the accompanying drawings, which form an integral part thereof.

BRIEF DESCRIPTION OF THE DRAWINGS

In the drawings.

In the various figures of the drawings like reference characters designate like parts.

DESCRIPTION OF THE PREFERRED EMBODIMENT

Figure 1:
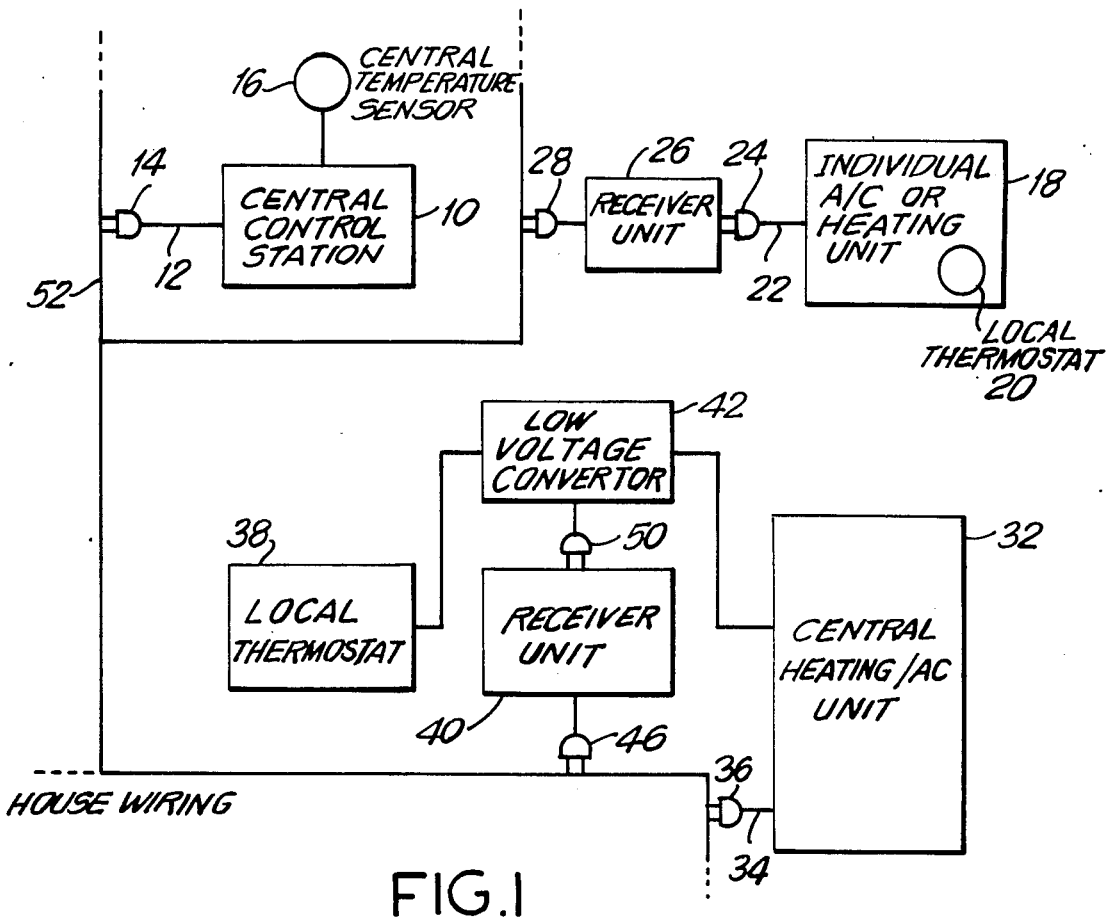
FIG. 1 is a block diagram of the temperature offset control system being utilized for controlling various types of heating and/or air conditioning units.
Figure 3A:
FIG. 3 is a series of graphs for use in explaining the utilization of the same turn on and turn off signal for controlling heating units and air conditioning units, selectively.
Figure 3B:
Figure 3C:
Figure 3D:
Figure 3E:
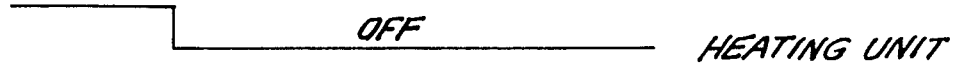
Figure 3F:

Referring now to FIG. 1, the temperature offset control system of the present invention is shown in block diagram form and includes a central control station 10 which is located at any convenient location. Typically, it can be located adjacent an exit doorway so that it can be operated as the user leaves the premises. However, the particular location is optionally selected. The central control station includes a wire 12 with a standard male plug 14 which is plugged into any convenient location into the house wiring. It can either be directly built into the house wiring using an electrical box installed on a wall, or alternately can actually be extended to a standard wall outlet and plugged into such outlet.

A central temperature sensor 16 is operatively connected to the central control station. The temperature sensor can be either built into the central control station or can be provided as a separate unit and coupled to the central control station, typically by means of hard wire. In this manner, the temperature sensor can be suitably situated so as to sense the ambient temperature in the particular house that is being controlled. It should be appreciated, however, that the temperature sensor is not associated with each particular heating and/or air conditioning unit being controlled, but rather is provided as a single unit associated with the central control station 10.

Provided within the premises being controlled, there can be included a plurality of individual air conditioning or heating units, typically shown at 18. In some cases, these can be window air conditioners, electric heaters, or individual wall units providing both heating and air conditioning. Other types of local individual stand alone units are well known. Each of these units 18 typically include the local thermostat 20 on which is set a particular temperature at which the unit should operate. When the approximate temperature is reached or within a small range of that temperature, the unit will turn on and subsequently when the range is crossed again in the opposing direction, the unit will turn off.

Normally, such individual units are provided with wires 22 containing male plugs 24 which are normally plugged directly into an outlet connected to the house wiring. However, in the present situation, there are provided receiver units 26 which receive the male plug 24 plugged into such units. In turn, the receiver unit itself has a male plug 28 which in turn is plugged into the house wiring. It is understood that wherever plugs are referred to, such plugs may be replaced with direct hard wire connections.

The house may also have a central heating and/or air conditioning unit. Alternately, such unit can be provided in place of the individual units. Typically, a unit of such central type is shown at 32. The unit itself would be energized by means of its own individual wire and plug arrangement 34, 36 wherein it would be connected to the house wiring. A local thermostat 38 would normally be provided in order to control the operation of the central heating and/or air conditioning unit. The local thermostat would be preset at a desired temperature and would control the operation of the central heating and/or air conditioning unit.

In the present situation, a receiver unit 40 is arranged to be serially interposed between the local thermostat and the central heating and/or air conditioning unit. Since the local thermostat operates at a low voltage, in order to interpose the receiver unit, a low voltage converter 42, typically a relay, is utilized.

More particularly, the receiver unit 40 is energized by means of the male plug 46 which interconnects into the house wiring. In turn the converter 42 is plugged into the receiver unit 40 by means of the plug 50. The local thermostat is then serially connected through the converter 42 to the central heating and/or air conditioning unit 32. The converter 42 can be a separate unit or built into receiver 40.

In the case of a relay, the receiver unit would energize the relay coil and would cause the relay switch to open and close thereby suitably connecting the local thermostat to the central heating and/or air conditioning unit accordingly.

The central control station 10 can be preset at a desired temperature range. This range will generally be much wider than the particular temperature setting of each individual local thermostat. The temperature value sensed at the central temperature sensor 16 can be compared with the range preset at the central control station. As these limit values of the temperature range which is set at the central control station are reached, a suitable turn on and turn off signal will be generated. These signals are then sent to control the operation of the individual and/or central heating and/or air conditioning units.

Communication between the central station and the individual unit can readily be accomplished by transmitting a high frequency coded signal directly onto the power lines. It is noted in FIG. 1, that the central control station is plugged into the house wiring 52 so that it can actually send the signals through said house wiring. The signals are then received by the individual receiver units 26, 40 which respond accordingly so as to permit the individual or central units to turn on and/or off in response to such control signals.

In this manner, the central control station can be preset with desired temperature range limits. When the user leaves the premises, he can press a switch at the central control station to place it in the offset mode. In this way, the only time that the individual units 18 or the central unit 32 will turn on will be when the central control station 10 sends out a control signal permitting it to turn on. This control signal will only be sent out when the offset temperature is reached.

For example, the local thermostats may be set at a desired value of 70°. Therefore, in the absence of the central control station, the individual or central units would operate so as to maintain the temperature within the premises at 70°. In the summer the air conditioners would turn on and off to maintain such temperature and during the winter the heating units would turn on and off to maintain such temperature.

Assuming that the central control station is set so as to provide a range of between 60 and 80 degrees, it will retain the temperature in the premises at 60° during the winter and at 80° during the summer. Therefore, during the winter it will prevent the heating unit from turning on at 70° as it normally would and instead will only permit it to turn on when the temperature is down to 60°. Similarly, in the summer, instead of the air conditioner turning on at 70° it will now turn on at 80°.

By means of the offset arrangement, energy is saved during the absence of the individuals from the premises, and at the same time the premises are prevented from getting too hot or too cold. Furthermore, a single unit can be provided for achieving both control of the heating as well as the air conditioning units.

Figure 2:
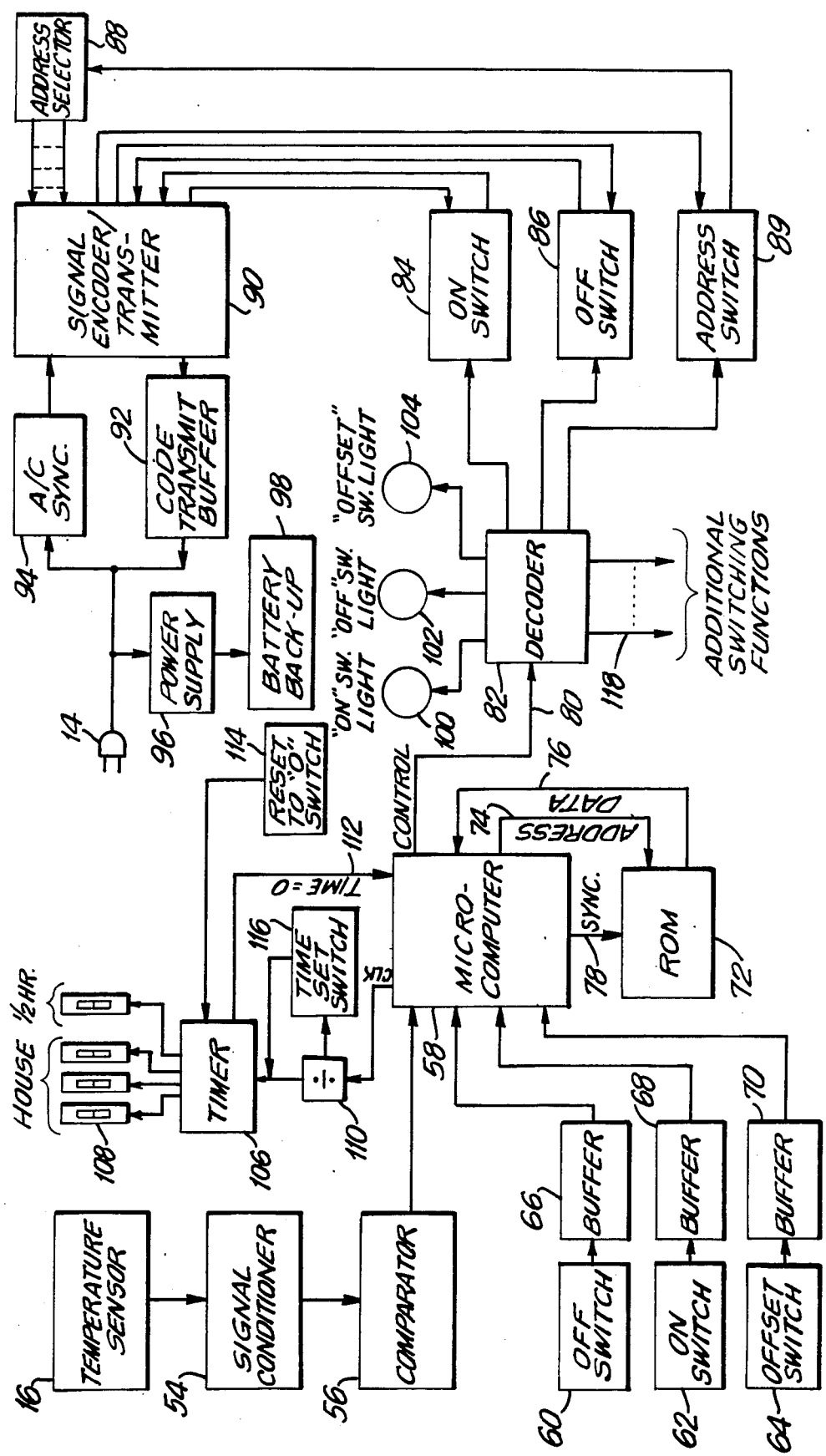
FIG. 2 is a detailed block diagram of the central control station, shown in FIG. 1.

Referring now to FIG. 2, there will be described in more detailed an embodiment of the central control station 10 shown in FIG. 1. The output of temperature sensor 16 is sent through a signal conditioner 54 through which the temperature range is preset. Typically, such signal conditioner 54 can be a voltage divider, amplifier, or other standard item utilized for such purposes. The temperature sensor itself can be any temperature sensor such as a linear sensor, a thermister, etc. By way of example, an Intersil AD590 sensor can be utilized.

The output of the signal conditioner is sent through a comparator 56 which produces an output signal dependent upon the comparison of the sensed temperature with the limits of the preset temperature range. The output from the comparator 56 is sent to a micro-computer 58.

The microcomputer 58 is typically a standard RCA CDP1802 or 1804 unit. Such unit can be programmed to provide all of the particular functions that will hereinafter be described. The utilization of such micro-computer and programming is well known in the art. It should, however, be appreciated that in place of the microcomputer specific hardware could be utilized to carry out each of the particular functions hereinafter being described.

Three switches 60, 62, 64 are provided to respectively control the particular mode of operation of the device. Switch 60 is used to indicate the "off" mode, switch 62 is used to indicate the "on" mode and switch 64 is utilized to indicate the "offset" mode. These can be any type of switches such as momentary push button switches or the like. The outputs of each of these switches are sent to a buffer 66, 68, 70 which can typically be a flip flop or the like. The output of each of the buffers is then sent to the micro-computer 58.

Dependent upon the particular model of micro-computer utilized, it may be necessary to utilize a ROM 72. Communication between the micro-computer and the ROM would be provided on lines 74 and 76 which would respectively send the address to the ROM whereupon the ROM would send back particular data to the microcomputer. Synchronization between the two would be provided along line 78. The output signal from the micro-computer is sent on the control line 80 to a decoder 82 which suitably determines which particular signal is being sent. When the ON mode is being operated or during offset when the comparator indicates that an ON signal should be sent, a signal is sent to the ON switch 84. Similarly, during the OFF mode of operation, or during the offset mode, when the comparator indicates that an OFF signal should be sent, the control signal is decoded by decoder 82 to indicate an OFF signal which thereby closes the OFF switch 86.

The particular type of device being utilized is one that can be directed to a particular receiver by means of a particular encoded address. Each receiver has an address so that the signal can be sent only to that receiver. An address selector 88 is utilized for selecting at the central control station the particular address of the receiver which is to be addressed. When the decoder 82 detects that a particular control signal 80 indicates the sending of an address, it causes the address switch 89 to close whereupon the address selector will properly identify the particular address which has been preselected and cause the signal encoding and transmitting device 90 to send out that address.

Similarly, the ON switch 84 will close the particular lines of the signal encoder and transmitter 90 to send out the ON signal and likewise the OFF switch 86 will cause the signal encoder and transmitter 90 to send out the OFF signal.

The signal encoder and transmitter 90 can be the BSR chip utilized as part of the BSR system for controlling lights, appliances, etc. This system utilizes the particular chip identified as GI542C. However, other systems such as LEVITON and others can be utilized.

The particular BSR system indicated transmits a high frequency coded signal of between 120 Kc–150 Kc over existing house power lines. The particular receivers described and associated with each particular heating and/or air conditioning unit are set to receive these signals and respond accordingly.

The signals at the output of the unit 90 are sent to a transmitter buffer unit 92 which can typically include a coil and transistor. From there they are sent onto the house power lines through the male plug 14.

In order to synchronize the system so that the signal is sent during zero crossings of the AC lines, there is provided an AC synchronization 94 between the power line and the signal encoder and transmitter unit 90.

To ensure that controller operation continues even during power failures, the power supply 96 is provided with a battery backup 98.

The particular mode which has been selected will be identified by one of three lights provided on a panel at the central control station. The signal light 100 will identify the ON mode, the light 102 identifies the OFF mode and light 104 identifies the OFFSET mode.

Should the individual want the system to change into the ON mode after a certain amount of time, there is provided a timer 106, which can typically be of a type ICL7217. Such timer includes a display output 108 which provides for three digits of hours plus a decimal digit.

The timer is controlled by means of an output clock signal from the micro-computer. However, such clock signal is at an extremely high rate and must thereby be divided down by means of the divider 110. When the timer reaches the preset time, it sends an output on line 112 to the microcomputer to indicate that the time has been reached and therefore cause the micro-computer to indicate a change to an ON mode. The timer itself can be reset by means of the reset switch 114 without causing any signal to be sent to the micro-computer. In order to set the timer at the desired value, the internal clock of the micro-computer could be utilized since that is a fast clock signal and the timer would respond quickly. However, normally such clock would be at an excessively high rate. Therefore, a time set switch 116 is provided which taps into the divider at a suitable rate less than the actual clock signal but faster than the operation of the timer. This can be utilized for fast setting of the timer to a desired value.

The particular timer described is one that is a count downtimer. Accordingly, it will count the time remaining. A person can set the clock for 10 hours if he knows he will be returning approximately that time. The counter will then count down the 10 hours and at the end of that time will indicate to the micro-computer that it should provide an ON control signal.

The operation of the unit is as follows. When a person leaves the premises, he can turn the system into its offset mode. In this mode, it will send ON and OFF signals to the unit as the limits of the temperature range are reached.

A unique aspect of the present system is that a single ON or OFF signal will control the heating unit or the air conditioning unit, depending upon the season. There is no need to provide inversion of the signal and no need to provide special switches for converting the signal.

This operation can best be understood with regard to FIG. 3. Assume that the reference temperature is 70 degrees and that the offset is set between 60 and 80 degrees, as shown on line (a). As a result, the, central control station will respond so that anywhere between 60° and 80° it will send out an OFF signal. As the temperature gets lower than 60, as for example during the winter, or as it gets higher than 80° as for example during the summer, it will provide turn on signals, as shown on line (b).

Assume that there is a local air conditioning thermostat controlling the air conditioning unit. That thermostat is, by way of example, set at 70°. When the temperature in the room is less than 70° the local thermostat will provide an OFF signal while when the temperature gets greater than 70° it will provide an ON signal. This is shown in line (c).

Similarly, with regard to a heating unit, as shown in line (d) if this is also set at 70° it will turn on the local heating unit at less than 70° and turn it off at greater than 70°.

Since the central control station operates a receiver unit and the receiver unit is effectively in series with the local thermostat, unless both the local thermostat is providing a turn ON signal as well as the receiver unit controlling a turn ON signal, the particular heating or air conditioning unit will not turn ON. As a result, as shown in line (e) the only time the heating unit will turn on is when both its local thermostat as well as the control signal is ON. Therefore, it will only respond to the turn ON signal from the central station when the temperture is below 60°. When the temperature is greater than 80° even though the same turn ON signal is provided from the central station, the heating unit will not respond since the local thermostat is not providing an ON signal.

In a similar manner, as shown in line (f) the air conditioning unit will only respond when the temperature is greater than 80°. At that point it will receive the turn ON signal and, since its local thermostat also provides an ON signal, it will turn ON. However, it will not respond to the same turn ON signal at the 60° value.

It is therefore appreciated, that it is the same turn ON signal and turn OFF signal that is being utilized to control both heating as well as air conditioning units and no special signal need be sent to the particular units.

When the individual sets the offset, it will therefore control the heating and air conditioning, depending upon the season, so as to maintain the temperature at the offset limits.

Should the individual want the entire system to go back to its normal temperature about an hour before he returns, the individual can set the timer 106 by means of the set switch 116 at approximately one hour before he plans to return home. At that time, the timer will send a signal to the micro-computer changing the state from offset to ON. In the ON state the microcomputer continues to provide such ON signals and the heating and-/or air conditioning units will operate dependent upon the setting of their local thermostats and will operate in a normal manner just as if the central station did not exist. Similarily, the individual may turn the heating and/or airconditioning off completely and preset the timer 106 to turn the systems back on after the preset delay has expired.

By means of the OFF switch 64, the user can actually utilize this as a central control switch for turning off all of the heating and/or air conditioning units. Therefore, when he goes away for an extended period of time, he can actually utilize the same central station for turning off his entire system.

Since the system works by means of addresses sent to particular receivers, the individual can set the particular receivers of each of his individual local heating and/or air conditioning units with the same address. In this way, when the address code is sent from the central station it will control all of the heating and/or air conditioning units in the entire premises and they will all respond to the ON/OFF and OFFSET signals from the central unit. As a result, even if he has quite a number of individual units in the various rooms of the house, he does not have to set each of these individually to an offset temperature but can utilize the central system for that purpose. Similarly, when he leaves the premises for an extended period of time, by means of the single switch at the central station he can turn off all of his units. Of course, where a central heating and/or air conditioning unit is provided, the central station will likewise control this.

Alternately, the individual may not want to have one or more individual units controlled by the central station. In this manner he can either eliminate the receivers from those units not being controlled, or set a separate address for those systems and provide separate control for those separate units.

It should be appreciated, that in addition to controlling heating and/or air conditioning systems, as described, the unit can also provide signals on the same house wiring for control of other electrical loads, such as lighting, appliances, etc. These are provided by means of the additional outputs 118 from the decoder 82. These outputs can then be sent with unique addresses to separate receivers for controlling lighting etc. in the home by means of the same central control station. Suitable lock outs would be needed to prevent the addresses from one group of receivers effecting the addresses of the other.

The central control station can be arranged to permit adjustment of the reference temperature and offset. Thus, if the reference temperature is set at 70° adjustment can be made plus or minus 15° by way of example.

A special feature of the present system is that the micro-computer provides for an internal clock which continuously recycles at a given fixed time, such as ½ hour. At the conclusion of each such cycle, it retransmits the last signal which has, been sent out. For example, if the system is in an ON mode, every half hour it will send out such ON signal. On the other hand, during the offset mode, it will check back what the last signal was and at the occurrence of each half hour cycle will transmit that signal. Preferably, during the OFF mode of operation, no recurring off signal will be sent.

The reason for sending these signals is to prevent the possibility of having the receivers accidentally respond to either another system or some noise on the line, a missed signal, or some manipulation whereby the device was turned on or off and thereby causing it to be out of synchronization with the controllor. By retransmitting the last sent out signal, assurance is made that the system is responding to the desired wishes of the user. However, during the continued OFF state, the user may wish to separately control each system and, accordingly, it is preferable not to send out any continuous OFF signal during this mode of operation.

Additionally, a delay is provided before starting the ON state. Normally, when a system such as a heating and/or air conditioning unit which contains a compressor, is changed from ON to OFF, it requires approximately two minutes before compressor recycling. Therefore, whenever an OFF signal is sent, there is a two minute lock out to prevent turning on the machine again before two minutes has elapsed.

In order to give each of the signals a chance to finish transmitting without interference of a subsequent signal, there is provided a lockout between signals. In the present system, 900 milliseconds of lockout is provided to prevent overlapping of transmission of signals.

The signals themselves are such that initially there is provided the address signal which, in the present situation, takes 10 milliseconds. There is then provided at least 40 milliseconds of delay followed by the turn ON or turn OFF code signal which takes another 10 milliseconds.

Figure 4:
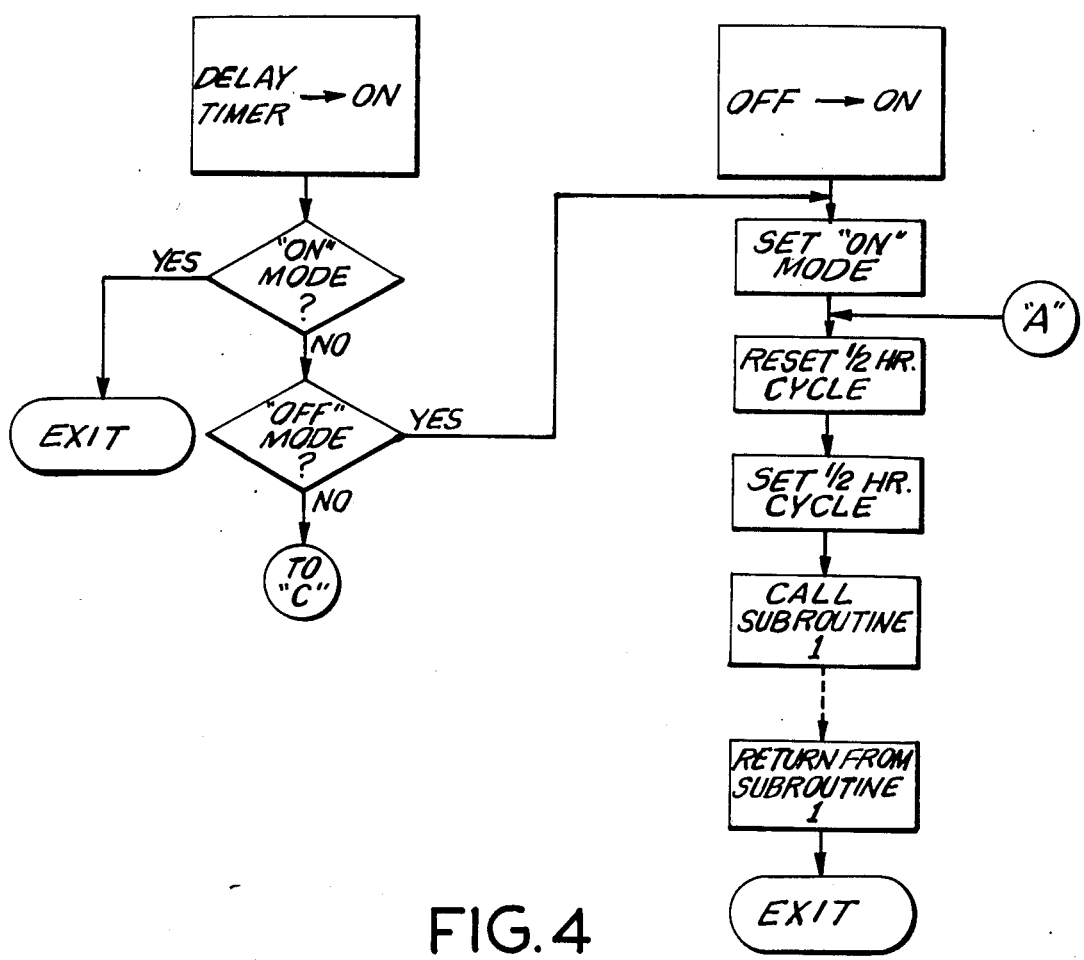
FIG. 4 is a flow diagram showing the steps involved in turning the central control station from an off to an on mode either directly or by means of a delay timer.

The particular steps involved in the operation of the microprocessor will be described with respect to the flow diagrams shown in FIGS. 4–12. Referring now to FIG. 4 when turning the mode switch from OFF to ON initially the ON mode switch is set. The one half hour cycle is reset and a new half hour cycle is set. A subroutine is called in which is now described with respect to FIG. 10. This subroutine 1 initially checks whether a 900 millsecond lock out is in effect. This would indicate whether a previous signal has not yet settled. Should it be within the 900 millisecond lock out, it will wait that period of time. If not, it goes on to check whether a 2 minute lock out is in effect. This indicates whether the machine was previously turned off. If not, a new 900 millisecond lock out is set followed by the address code being sent out for the particular receivers. After the space code the ON signal code is sent out and a Q flag is set equal to 1. The purpose of the Q flag will be utilized in conjunction with the ½ hour recycling, as will hereinafter be explained in connection with FIG. 8.

As shown in FIG. 4, a similar operation will be indicated when the delay timer is set. At the end of the delay time, it will change into an ON mode. When this occurs, a first check is whether the system has been previously set in an ON mode. If it has, then nothing further is done and the system exits the program. On the other hand, if it was not in an ON mode, it must check whether it was in an OFF mode. If it was previously in an OFF mode, then the system effectively is going from an OFF to an ON mode and then reverts to the right hand portion of the program, previously described.

Figure 5:
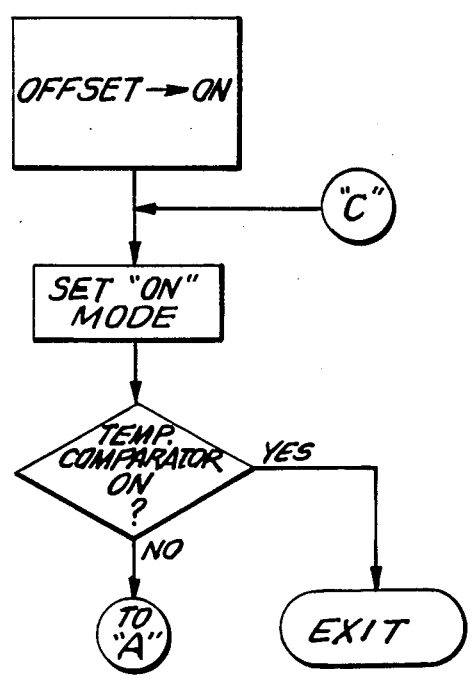
FIG. 5 is a flow diagram showing the steps involved in turning the central control station from an offset mode to an on mode.

On the other hand, if it was not in an OFF mode then it must have been in the only other possibility, namely the OFFSET mode, in which case it is turning from offset to ON. This is indicated by going to the location C within the program which is shown in FIG. 5.

When going from OFFSET to the ON mode initially the ON mode switch must be set. The temperature comparator is then checked as to what its state was previously when it was in the OFFSET mode. A check is made whether it was previously in the ON condition. If it was, then it must stay in the ON condition and no change is necessary and the program exits. On the other hand, if it was not in the ON condition, it was then automatically in the OFF condition and at that point it enters at the point A of the program shown in FIG. 4 which turns from the OFF mode to the ON mode. It should also be noted, that the point C enters into this FIG. 5 to effectively change from OFFSET to ON if the delay timer causes the ON signal to occur and the system was previously in the OFF condition of the OFFSET mode.

Figure 6:
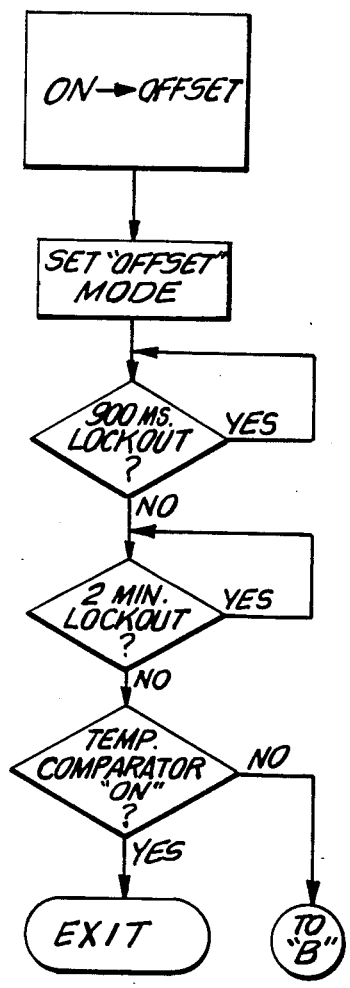
FIG. 6 is a flow diagram showing the steps involved in turning the central control station from the on mode to an offset mode.

Referring now to FIG. 6, there is shown the effect in going from the ON mode to the OFFSET mode. Initially the OFFSET mode is set. Then the 900 millisecond lock out is checked and the two minute lock out is checked. The temperature comparator is also checked to see what its previous state was. If it was previously producing an output signal indicating that it is in the ON condition, then effectively the system continues sending the same type signal and no further action is needed and the program exits. On the other hand, if the temperature comparator was not producing a signal causing an ON condition, then it was producing a signal in the OFF condition, and effectively, a change must be made from the OFF mode to the ON mode. The system will exit at the point B and will now enter at the point B in the FIG. 12, to be hereinafter described in connection with ON-OFF operation.

Figure 7:
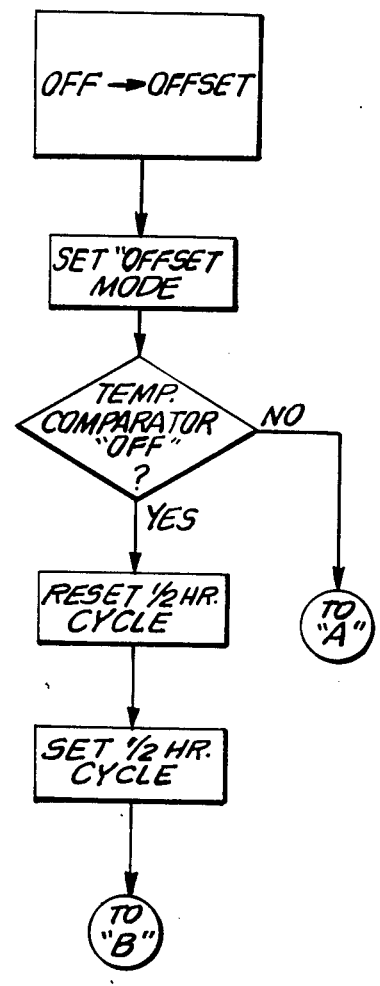
FIG. 7 is a flow diagram showing the steps involved in turning the central control station from an off mode to an offset mode.

Referring now to FIG. 7, there is described the procedure when going from the OFF to the OFFSET mode. First the OFFSET mode is set. The temperature comparator is checked whether it was producing a signal causing an OFF condition. If it was, the ½ hour cycle must be reset since no such cycle was being utilized in the OFF mode. Therefore, the ½ hour cycle is reset and newly set again. The program then moves to the entry point B on FIG. 12, as will hereinafter be described.

On the other hand, if the temperature comparator was not producing a signal causing an OFF condition, it effectively was producing a signal causing an ON condition. The program then leaves at point A to go back into FIG. 4 whereby it then calls up subroutine 1 from FIG. 1 in order to send out a new ON signal.

Skipping now to FIG. 9, there will be described a situation in going either from the ON to the OFF mode or the OFFSET to the OFF mode. In either case, initially the OFF mode is set followed by a check of the 900 millisecond lock out. After that, the two minute lock out is reset and a new two minute lock out is set. This ensures that no further signals will be produced to turn on the air conditioner during those two minutes. The ½ hour recycle is reset. It is not set again since no OFF signals will be sent out recurringly during the OFF mode. However, the 900 millisecond lock out is set and subsequently the address code, space code and OFF code are sent out. The Q flag is set equal to zero, as will be needed for the ½ hour cycle flag discussed in FIG. 8.

Figures 10, 11, 12:
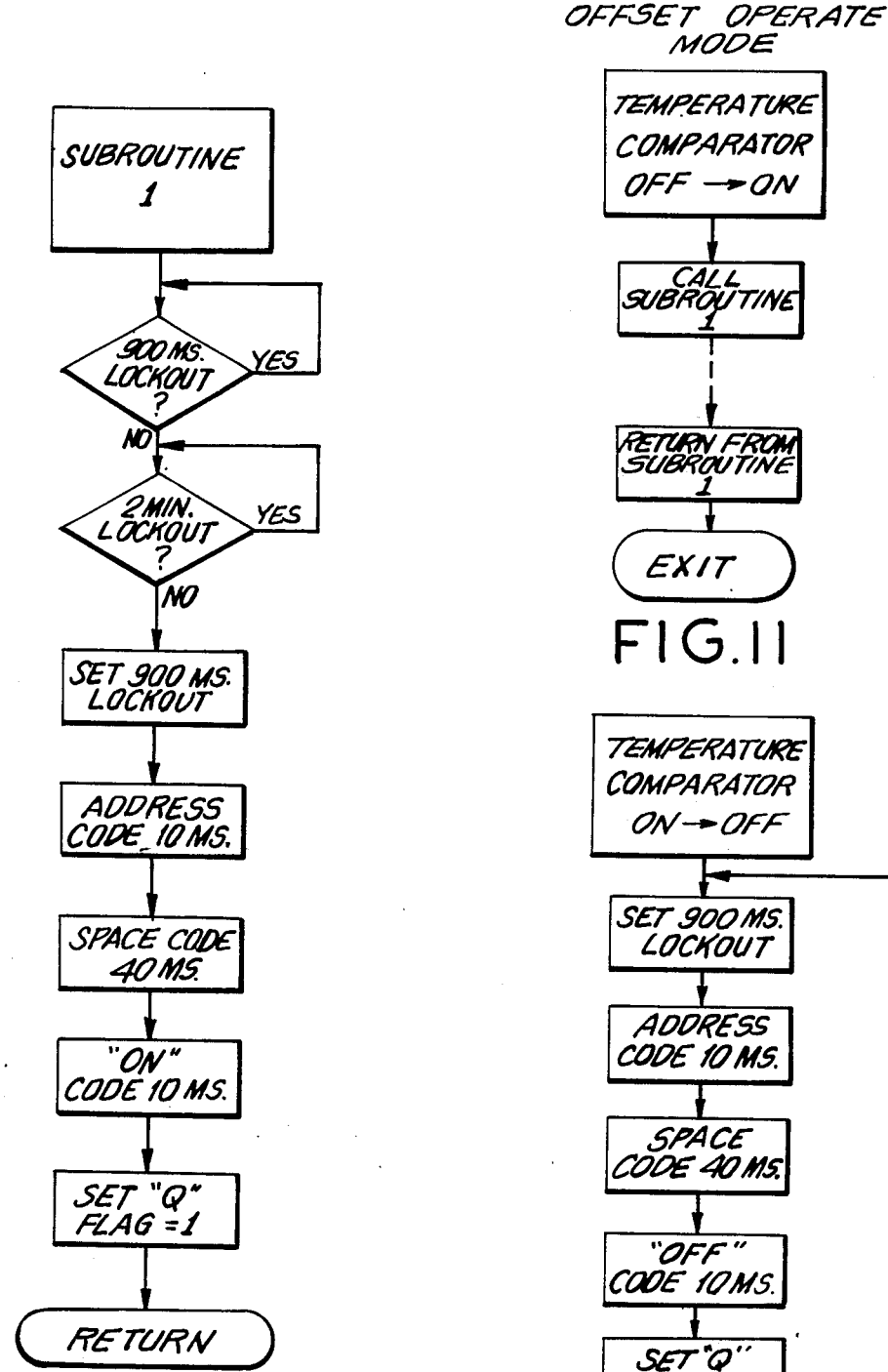
FIG. 10 is a flow diagram showing a particular subroutine which is utilized in various other flow diagrams.
FIG. 11 is a flow diagram showing the operation involved at the central control station during the offset mode with the temperature comparator providing a change from off to on, and FIG. 12 is a flow diagram showing the operation in the offset operate mode wherein the temperature comparator provides a change from on to off.

During the OFFSET mode, the temperature comparator continues to operate and will change its output so as to cause a change in the signal from OFF to ON and ON to OFF. FIG. 11 shows the program when the temperature comparator produces a signal changing from OFF to ON. The subroutine 1 shown in FIG. 10 is called up whereby after various checks and settings, the procedure is followed to send out the ON code and the Q flag is set equal to 1.

When the temperature comparator goes from the ON to the OFF mode, the 900 millisecond lockout is set followed by the sending out of the OFF code which requires first the address code, the space code and finally the OFF code signal. The Q flag is set equal to zero and a two minute lock out is now set since there was a change from ON to OFF.

Figures 8, 9:
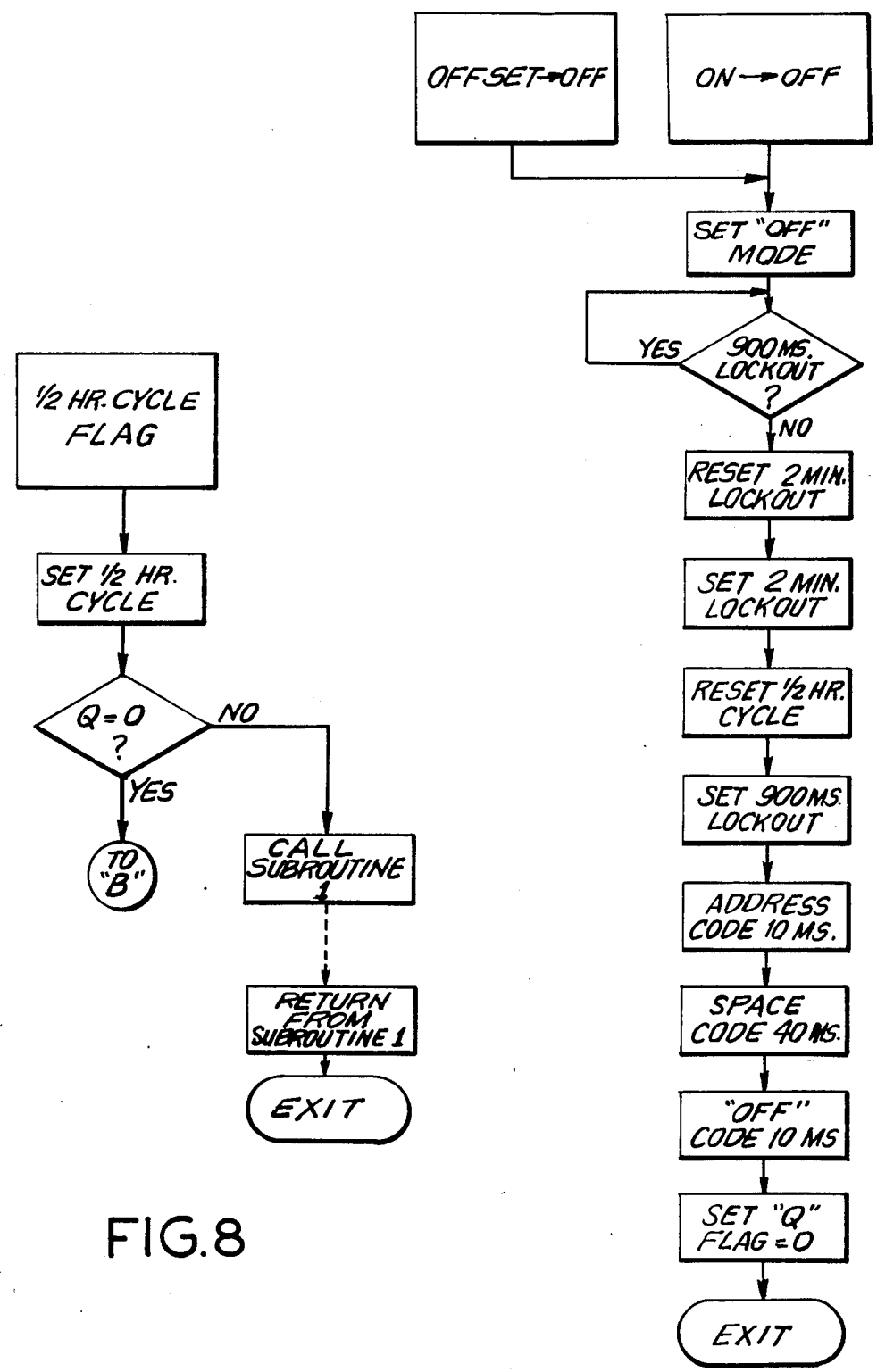
FIG. 8 is a flow diagram showing the steps involved during the course of the recycling and retransmitting operation at the central control station.
FIG. 9 is a flow diagram showing the steps involved in turning the central control station from either offset or on modes into an off mode.

It should be appreciated that the entry point B from FIGS. 7 and 8 also enter into the program shown in FIG. 12. These occurred in FIG. 7 when there was a change from the OFF to the OFFSET, and also will occur when a OFF code signal has to be sent out during the recycling.

The recycling is described in FIG. 8 where there is set a ½ hour cycle each time. The Q is then checked. IF the Q has been set to zero, this indicates that previous OFF signals were sent. It then enters into point B at FIG. 12 to send out again an OFF signal. This will only occur during the offset mode. It will not occur during the OFF mode.

On the other hand, if Q has been set equal to 1, it will call up subroutine 1 which will cause the ON signal to be reset. This will occur both in the ON mode and during the offset mode when the temperature comparator produces an ON signal.

Again it should be appreciated that although this software embodiment has been shown in connection with the micro computer chip, other logical scenarios can be utilized to accomplish the same results. Each of these functions could also have been carried out by means of a hardware embodiment, as is well known in the art to produce such functions.

It should accordingly be appreciated, that the present system provides an energy control which will reduce heating and/or air conditioning costs substantially for individual home and apartment users by offsetting the temperature making it higher in summer and lower in winter. The system can be used to control window air conditioners, central air conditioning systems, individual electric heating units, and central heating systems, either individually or in combination. It can be installed very easily with unskilled labor. The relative cost is low and this system is easily maintained.

There has been disclosed heretofore the best embodiment of the invention presently contemplated. However, it is to be understood that various changes and modifications may be made thereto without departing from the spirit of the invention.

What is claimed is:

1. A temperature offset control system for controlling the operation of both heating and air conditioning systems simultaneously contained within the same premises each of which is set by local thermostats to operate at an appropriate temperature, said offset control system comprising:

a central control station having means for presetting an offset temperature range, means for sensing the temperature at a central location, means for comparing the sensed temperature with the offset temperature range, means responsive to the comparison for producing a control signal indicative of whether the sensed temperature is within said offset temperature range or beyond said offset temperature range, and means for transmitting said control signal onto the standard energy lines servicing the premises; and a receiving station respectively associated with each heating and air conditioning system, said receiving stations each comprising means for receiving the same transmitted control signal from the energy lines, and switch means for controlling the energization of the respective system in response to the received control signal, wherein said heating systems and associated local thermostat are disabled by said control signal when said control signal originates from a sensed temperature above the lower end of the offset temperature range, and said air conditioning systems and associated thermostats are disabled by the same control signal when said control signal originates from a sensed temperature below the upper end of the offset temperature range;

wherein said central control station comprises control switching means having an ON mode for producing a turn ON signal, and OFF mode for producing a turn OFF signal and an OFFSET mode for producing said control signal responsive to the particular output of the comparing means, and timer means permitting automatic timed switching between any two of said three modes, and further comprising means for checking the previous signal sent and only sending a signal entered on said central control station changing a previous signal sent.

2. A control system as in claim 1, wherein the limits of said temperature range extending beyond the appropriate temperature set for the operation of the heating and air conditioning systems.

3. A control system as in claim 1, and further comprising indicator means for indicating the selected mode of said switch means.

4. A control system as in claim 1, further comprising presettable timer means for switching to said on mode after termination of a preset time.

5. A control system as in claim 1, wherein each of said receiving stations are uniquely addressable, and wherein said central station comprises means for transmitting specific receiver addresses as part of said control signal.

6. A control system as in claim 1, wherein each heating and air conditioning system comprises a local thermostat, and wherein said local thermostat is serially connected with its respective receiving station, whereby both the local thermostat and the receiving station must be enabled for energization of the respective heating and air conditioning system.

7. A control system as in claim 1, and further comprising means for producing a time delay after each turn ON and turn OFF signal to prevent overlapping of transmission signals.

8. A control system as in claim 1, and further comprising delay means for producing a timed delay prior to transmitting a turn ON signal to thereby permit the internal gas pressures of a compressor type heating or air conditioning system to equalize should it have been just turned off.

9. A control system as in claim 1, and further comprising timer means for producing a recurring time signal and for retransmitting the last previous transmitted control signal at each occurrence of said time signal.

10. A control system as in claim 9, and further comprising means for resetting said recurring time signal in conjunction with the turn ON signal.

11. A control system as in claim 10, and further comprising means for preventinq retransmitting during said OFF mode of operation.

12. A control system as in claim 1, wherein said transmitting means comprises means for modulating the control signal onto the AC house current.

13. A control system as in claim 1, and wherein said control switching means further provides additional control signals for controlling the activation of electrical loads, said electrical loads only responding to the ON mode and the OFF mode and not to the OFFSET mode.

14. A control system as in claim 1, wherein said offset temperature range presetting means comprises means for setting a desired mean temperature value and means for setting a deviation amount, the deviation amount on either side of the mean temperature defining the offset temperature range.

* * * * *